(12) United States Patent
Baumgartner

(10) Patent No.: US 7,593,061 B2
(45) Date of Patent: Sep. 22, 2009

(54) METHOD AND APPARATUS FOR MEASURING AND/OR CORRECTING AUDIO/VISUAL SYNCHRONIZATION

(75) Inventor: Hans Andreas Baumgartner, San Diego, CA (US)

(73) Assignee: Sarnoff Corporation, Princeton, NJ (US)

( * ) Notice: Subject to any disclaimer, the term of this patent is extended or adjusted under 35 U.S.C. 154(b) by 623 days.

(21) Appl. No.: 11/159,966

(22) Filed: Jun. 22, 2005

(65) Prior Publication Data

US 2006/0013565 A1    Jan. 19, 2006

Related U.S. Application Data

(60) Provisional application No. 60/581,785, filed on Jun. 22, 2004.

(51) Int. Cl.
    *H04N 9/475* (2006.01)
(52) U.S. Cl. .................. 348/515; 348/512; 348/484
(58) Field of Classification Search ............. 348/515, 348/512, 518, 571, 576, 578, 632, 633, 722, 348/423, 462, 480–485; 386/52, 54, 75
See application file for complete search history.

(56) References Cited

U.S. PATENT DOCUMENTS

| | | | | |
|---|---|---|---|---|
| 4,313,135 | A * | 1/1982 | Cooper ..................... | 348/512 |
| 5,243,424 | A * | 9/1993 | Emmett .................... | 348/484 |
| 5,287,182 | A * | 2/1994 | Haskell et al. ............ | 348/500 |
| 6,184,937 | B1 * | 2/2001 | Williams et al. .......... | 348/515 |
| 6,414,960 | B1 | 7/2002 | Kuhn et al. | |
| 2003/0128294 | A1 | 7/2003 | Lundblad et al. | |
| 2004/0100582 | A1 | 5/2004 | Stanger | |
| 2006/0078305 | A1 * | 4/2006 | Arora et al. .................. | 386/96 |
| 2007/0126929 | A1 * | 6/2007 | Han et al. ................... | 348/515 |
| 2008/0079851 | A1 * | 4/2008 | Stanger et al. .............. | 348/575 |

FOREIGN PATENT DOCUMENTS

EP          0683604 A          11/1995

OTHER PUBLICATIONS

J. R. Emmett, "Maintaining audio and video synchronisation with cancelled markers," IEEE, International Broadcasting Convention,, Conference Publication No. 397, Jan. 1, 1994, pp. 146-151.
European Search Report for EP 05763363, dated Feb. 17, 2009.

* cited by examiner

*Primary Examiner*—M. Lee
(74) *Attorney, Agent, or Firm*—Lowenstein Sandler, PC

(57) ABSTRACT

A method and apparatus for measuring and/or correcting audio/visual synchronization is disclosed. In one embodiment, a method for providing synchronization of a video signal and a corresponding audio signal associated with the audio/visual transmission includes detecting a triggering video event in the video signal and inserting a synchronization signal into the audio signal, where the synchronization signal is correlated to the triggering video event. In another embodiment, a method for measuring and optionally correcting the synchronization of the video signal and the audio signal includes detecting the triggering video event in the video signal, detecting the synchronization signal in the audio signal, and assessing the synchronization of the video signal and the audio signal in accordance with a time offset between the triggering video event and the synchronization signal. Implemented in conjunction, these two embodiments provide a method and apparatus for both measuring and correcting the end-to-end synchronization of an audio-video system.

26 Claims, 2 Drawing Sheets

METHOD AND APPARATUS FOR MEASURING AND/OR CORRECTING AUDIO/VISUAL SYNCHRONIZATION

CROSS-REFERENCE TO RELATED APPLICATIONS

This application claims benefit of U.S. provisional patent application Ser. No. 60/581,785, filed Jun. 22, 2004, which is herein incorporated by reference in its entirety.

BACKGROUND OF THE INVENTION

Synchronization of audio and video signals in an audio/visual (A/V) transmission is an important measure of the quality of the transmission. However, despite (and in some cases due to) advances in A/V transmission systems, such as digital television, high-definition television and satellite television, A/V synchronization remains problematic.

For example, in typical digital television transmissions, audio and video signals are each compressed and decompressed with different delays and latencies. The audio and video signals thus need to be re-synchronized at each point where content is modified, retransmitted or displayed in order to ensure a seamless A/V transmission. Some existing A/V transmission systems, including some digital video, digital audio and MPEG-2 transport systems, provide time code references for synchronization of audio and video signals; however, the time code references are typically only applied in production facilities and are not carried throughout the entire broadcast chain (which typically ends with the consumer). Thus, A/V synchronization of the end product is not assured. Other proposed solutions have had more success in terms of providing proper A/V synchronization, but significant complexity has made such solutions cost prohibitive.

Therefore, there is a need in the art for a method and apparatus for measuring and/or correcting audio/visual synchronization.

SUMMARY OF THE INVENTION

A method and apparatus for measuring and/or correcting audio/visual synchronization is disclosed. In one embodiment, a method for providing synchronization of a video signal and a corresponding audio signal associated with the audio/visual transmission includes detecting a triggering video event in the video signal and inserting a synchronization signal into the audio signal, where the synchronization signal is correlated to the triggering video event. In another embodiment, a method for measuring and optionally correcting the synchronization of the video signal and the audio signal includes detecting the triggering video event in the video signal, detecting the synchronization signal in the audio signal, and assessing the synchronization of the video signal and the audio signal in accordance with a time offset between the triggering video event and the synchronization signal. Implemented in conjunction, these two embodiments provide a method and apparatus for both measuring and correcting the end-to-end synchronization of an audio-video system.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In one embodiment, the present invention discloses a method and apparatus for measuring and/or correcting audio/visual (A/V) synchronization. In particular, a method is provided that enables the measurement and/or correction of synchronization of corresponding audio and video signals associated with an A/V transmission by inserting a synchronization signal into the audio signal.

Figure 1:
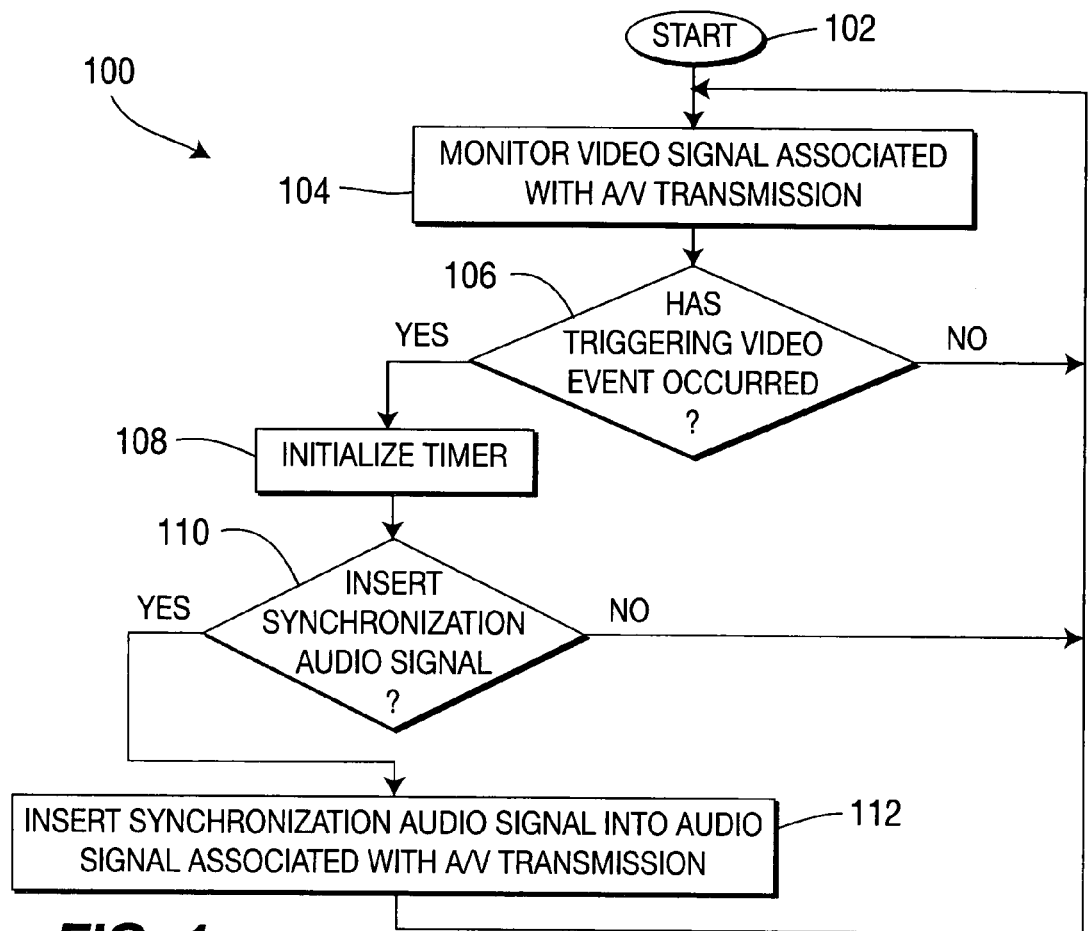
FIG. 1 is a flow diagram illustrating one embodiment of a method for marking A/V transmissions for A/V synchronization, according to the present invention.

FIG. 1 is a flow diagram illustrating one embodiment of a method 100 for marking A/V transmissions for A/V synchronization, according to the present invention. The method 100 may be implemented in, for example, a device that is positioned in the path of an A/V transmission (e.g., a digital television broadcast) at a point of known synchronization. Such a device could be employed by the originator (e.g., a television network) or broadcaster (e.g., a television station) of the A/V transmission.

The method 100 is initialized at step 102 and proceeds to step 104, where the method 100 monitors a video signal associated with an A/V transmission. In step 106, the method 100 determines whether a triggering video event (TVE) has occurred in the monitored video signal. The TVE is a predetermined or calculated, potentially gross quality of the video signal that, statistically, will occur at regular or otherwise sufficient (e.g., potentially irregularly occurring or purposefully inserted) intervals or locations (e.g., on the order of approximately once per x seconds).

In one embodiment, the TVE is an event that is easily detected by direct analysis of a digital or analog representation of the video image or by direct analysis of readily decoded values (e.g., direct current coefficients) in a compressed video stream. For example, a TVE might be at least one of: a transition in the average brightness or the color of at least part (e.g., the entire or a predetermined subset) of the video image, a scene change (e.g., as detected by a detection system configured for this purpose), a particular brightness differential, a change in the spatial or temporal properties of the video signal, an appearance or disappearance of a pattern in the video signal, a property of an encoded or compressed representation of the video signal, an image or sequence of images purposefully inserted into the video signal or a combination or sequence of events in the video signal, among others.

Those skilled in the art will appreciate that a triggering video event could encompass a variety of characteristics of the video signal that either are directly predetermined or are indirectly calculated based not only on exactly repeatable qualities, but also on context, pseudo-random data or other definable properties that may not be precisely described or defined in advance of detection of a TVE.

If the method 100 determines in step 106 that a TVE has not occurred, the method 100 returns to step 104 and continues to monitor the video signal for the next TVE. Alternatively, if the method 100 determines in step 106 that a TVE has occurred, the method 100 proceeds to step 108 and initializes a timer, substantially at the same time that the TVE is detected.

In step 110, the method 100 determines whether a synchronization audio signal (SAS) should be inserted into the audio signal associated with the A/V transmission (i.e., the audio signal that is to be synchronized with the monitored video signal), in response to the detected TVE. The SAS correlates the audio signal to the TVE in the video signal. In one embodiment, the SAS is at least one of: a tone or an audio watermark, such as a multi-frequency or spread spectrum signal, a perturbation of the audio signal's phase, amplitude, frequency or characteristics, a modification of the encoded or compressed representation of the audio signal a tone, an audio watermark, a multi-frequency signal, a spread-spectrum signal, a perturbation of a phase of said audio signal, a perturbation of an amplitude of said audio signal, a perturbation of a frequency of said audio signal, a perturbation of one or more characteristics of said audio signal, a modification of an encoded representation of said audio signal, a modification of a compressed representation of said audio signal, a modification of data representing the audio signal, a numeric sequence inserted in the data representing the audio signal, an insertion into auxiliary data carried with the audio signal, a modification of the auxiliary data or a modification of relative audio properties between two or more channels of the audio signal. In one embodiment, the SAS is electronically detectable, but is substantially imperceptible to the human ear. In further embodiments, the SAS may use a known mathematical code, such as a Barker code, to provide simplified, more accurate or more precise detection.

In further embodiments, the SAS also carries data. For example, the SAS may be capable of encoding a substantially precise time reference in the audio signal. That is, some characteristic of the audio signal may indicate a specific point in the audio signal to a level of accuracy that is sufficient to provide the desired synchronization of the audio and video signals.

A determination as to whether an SAS should be inserted into an audio signal in response to a detected TVE can be made in accordance with a variety of criteria. For example, a user may wish to have an SAS inserted every time a TVE is detected. Alternatively, the user may wish to insert an SAS only during predefined portions of an A/V transmission, or based on properties of the audio or video content (e.g., volume level, video activity and the like). In further embodiments, the determination of whether to insert an SAS into the audio signal is based on whether or not the current properties of the video signal would cause ambiguity of the associated TVE. For example, an SAS may not be inserted during periods where multiple TVEs occur during a given time period (e.g., during the period between the TVE and the desired SAS insertion point).

If the method 100 determines in step 110 that an SAS should not be inserted in accordance with the detected TVE, the method 100 returns to step 104 and continues to monitor the video signal for the next TVE.

However, if the method 100 determines in step 110 that an SAS should be inserted in accordance with the detected TVE, the method 100 proceeds to step 112 and inserts the SAS into the audio signal associated with the A/V transmission at an appropriate or specified time. For example, in one embodiment, the method 100 inserts the SAS at the first suitable location following the TVE (e.g., a location where the properties of the audio signal, such as volume or content, would make the SAS less perceptible to the human ear and/or more perceptible electronically). For example, a louder segment of the audio signal may be a more suitable insertion point than a silent segment of the audio signal, since the volume may help to conceal the SAS. In this case, the individual time offsets of the respective SASes relative to the corresponding TVEs are variable (e.g., all time offsets are not necessarily of equal length as they will depend on the times at which the TVEs are detected and the length of time required to find a suitable insertion point). In one embodiment, if the amount of time elapsed before a suitable insertion point is found exceeds a predefined maximum offset, the insertion of the SAS may be cancelled, or a special SAS (e.g., by its nature or enclosed data) indicating cancellation may be sent.

In another embodiment, the method 100 inserts the SAS after a predetermined amount of time or data units elapses following the TVE (e.g., one second after the detected TVE). This predefined amount of time is tracked by the timer initialized in step 108. In this case, the time offset is predefined such that all time offsets of SASes relative to corresponding TVEs are of substantially equal length.

In one embodiment, the time offset of the SAS relative to the associated TVE is encoded into the SAS. This is particularly useful in the case where the individual time offsets are variable. Once the SAS is inserted in an appropriate location, the method 100 returns to step 104 and continues to monitor the video signal for the next TVE.

In this manner, the method 100 marks an audio signal for efficient synchronization in accordance with an associated video signal. As described in further detail below, the SASes inserted into the audio signal may be retrieved and used to confirm proper synchronization of the audio and video signals. Moreover, the marking is done in a way that leaves the video signal substantially untouched—that is, little to no modification of the video signal is necessary to achieve proper marking and A/V synchronization. In fact, most embodiments of the present invention involve no modification of the video signal whatsoever. The method 100 is thus easy and relatively inexpensive to implement. In addition, since the SAS is carried in the audio signal, the A/V transmission may be synchronized at any point in the path of transmission (e.g., from the originator to the consumer), such that end-to-end synchronization can be achieved.

Moreover, the method may be applied to A/V systems that process multiple channels of audio and/or video to ensure A/V synchronization of all corresponding channels. For example, the method 100 may be implemented to synchronize a video signal with multiple channels of stereo or surround sound audio, primary and alternate audio (e.g., alternate language tracks) or audio delivered by alternate means (e.g., "fall back" audio).

In some embodiments, the method 100 may monitor the sources of the video and/or audio signals (e.g., as opposed to the signals themselves) for synchronization purposes. For example, the source of the video signal (e.g., a scene embodied in the video signal) could be directly monitored using an external device that is mounted to or near a video camera capturing the scene, such where the external device does not require access to the captured video data. The external device is adapted to perform the method 100. In this case, the external device may emit or cause the generation of the SAS.

Figure 2:
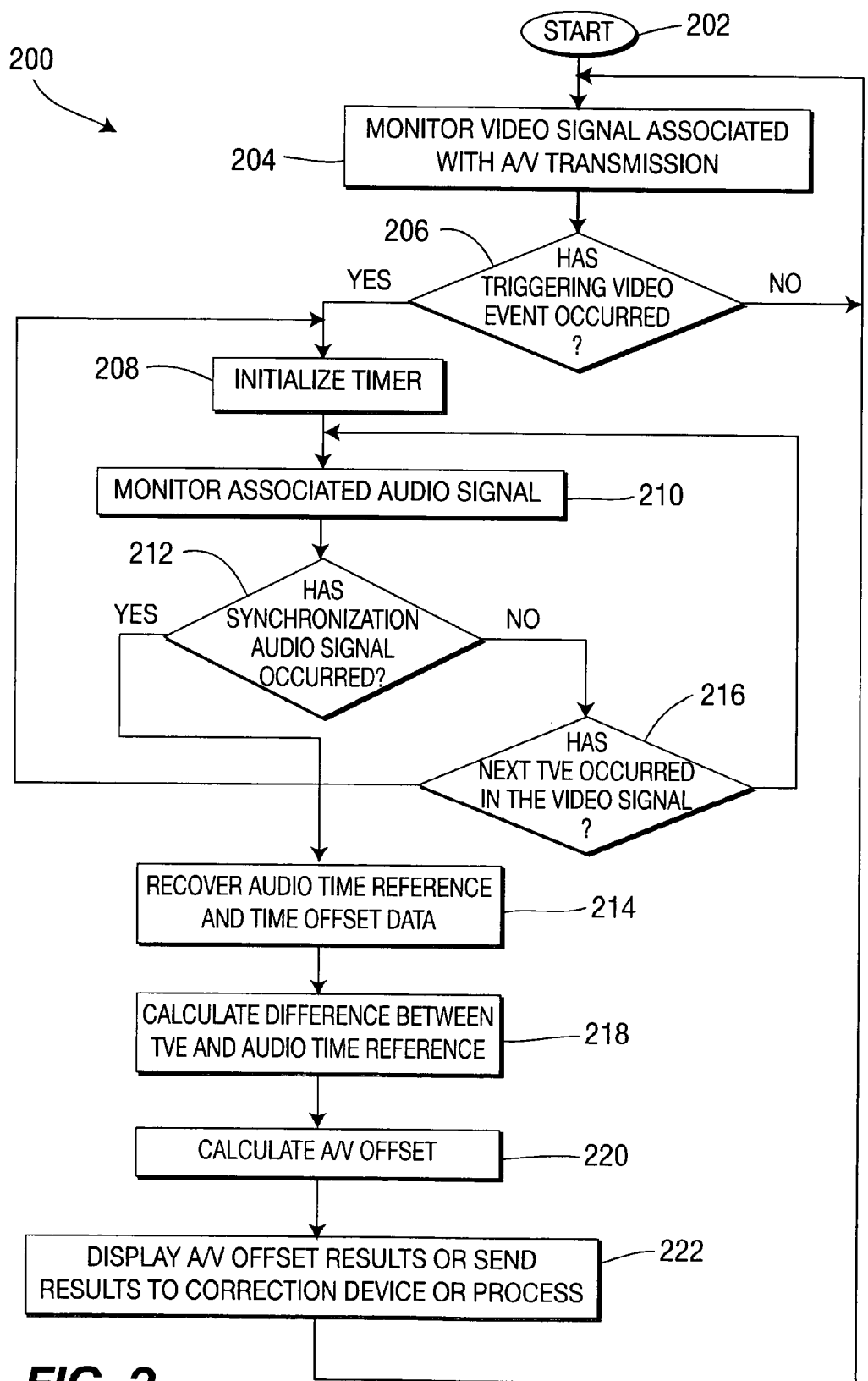
FIG. 2 is a flow diagram illustrating one embodiment of a method for measuring and optionally correcting the synchronization of audio/visual transmissions, according to the present invention.

FIG. 2 is a flow diagram illustrating one embodiment of a method 200 for measuring and optionally correcting the synchronization of audio/visual transmissions, according to the present invention. The method 200 is designed to recover SASes and/or other data inserted into the A/V transmission (e.g., in accordance with the method 100) and apply the recovered data in order to properly synchronize associated audio and video signals. Like the method 100, the method 200 may be implemented in, for example, a device that is positioned in the path of an A/V transmission. Such a device could be employed by the receiver (e.g., a consumer or re-broadcaster, such as a local television affiliate or cable television service) of the A/V transmission.

The method 200 is initialized at step 202 and proceeds to step 204, where the method 200 monitors a video signal associated with an A/V transmission. In step 206, the method 200 determines whether a TVE has occurred in the monitored video signal.

If the method 200 determines in step 206 that a TVE has not occurred, the method 200 returns to step 204 and continues to monitor the video signal for the next TVE. Alternatively, if the method 200 determines in step 206 that a TVE has occurred, the method 200 proceeds to step 208 and initializes a timer, substantially at the same time that the TVE is detected.

In step 210, the method 200 monitors the audio signal associated with the monitored video signal. Specifically, the method 200 monitors the audio signal to detect the presence of an SAS. Thus, in step 212, the method 200 determines whether an SAS has occurred in the monitored audio signal since the detection of the TVE in the associated video signal.

If the method 200 determines in step 212 that an SAS has not occurred, the method 200 proceeds to step 216 and determines whether the next TVE has occurred in the video signal. As discussed above, in some cases, not every TVE will be associated with a corresponding SAS. Thus, if the TVE that was detected in step 206 does not correspond to an SAS, the next TVE should occur before an SAS. Therefore, if the method 200 determines in step 216 that the next TVE has occurred, the method 200 returns to step 208, re-initializes the timer, and proceeds as described above with respect to steps 208-212. In this manner, TVEs that are not followed by SASes are disregarded. Alternatively, if the next TVE has not occurred, the method 200 returns to step 210 and continues to monitor the audio signal for an SAS.

Returning to step 212, if the method 200 determines that an SAS has occurred, the method 200 proceeds to step 214 and recovers the audio time reference (i.e., the time in the audio signal at which the SAS occurred) and the associated time offset data. In cases where the time offset is predefined as described above, there may be no need to recover the time offset as it will already be known.

In step 218, the method 200 calculates a first difference between the time at which the TVE occurred and the audio time reference. That is, the method determines the actual time offset between the TVE and the SAS. The method 200 then proceeds to step 220 calculates the A/V offset (e.g., the actual offset of the video signal relative to the audio signal) in accordance with the first difference. In one embodiment, calculation of the A/V offset involves determining whether the first difference differs substantially (e.g., outside a predefined tolerance or threshold) from the expected time offset (e.g., as predefined or as encoded in the SAS).

In one embodiment, the A/V offset is calculated by providing a data point representing a second difference (between the expected time offset and the first difference) to a smoothing calculator. Once a sufficient number of data points have been collected and evaluated, the A/V offset is produced. The sufficiency of the number of data points required to produce the A/V offset will typically vary based on the requirements of the particular application.

In step 222, the method 200 may do one of two things. The method 200 may: (1) display the A/V offset to a user (e.g., for manual correction); or (2) the method 200 may send the A/V offset to a correction device or process for further corrective action. The method 200 then returns to step 204 and proceeds as described above to continue to monitor the video signal (e.g., for the next TVE).

In one embodiment, a correction device or process for correcting the A/V synchronization in accordance with the A/V offset takes a corrective action that includes at least one of: adjusting delay of the audio or video signal, adjusting time stamps, adjusting a position of the audio or video signal in the A/V transmission, prolonging or eliminating a display of certain video frames, or eliminating, shrinking or extending audio segments.

The method 200 thereby enables the proper synchronization of associated audio and video signals without resorting to modification of the video signal. That is, embodiments of the method 200 recover data that has been inserted only into the audio signal, and use this data to analyze and/or correct the A/V synchronization. As discussed above with respect to the method 100, such an approach is typically easier and more inexpensive to apply than one in which just the video signal, or both the video signal and the audio signal are modified.

Figure 3:
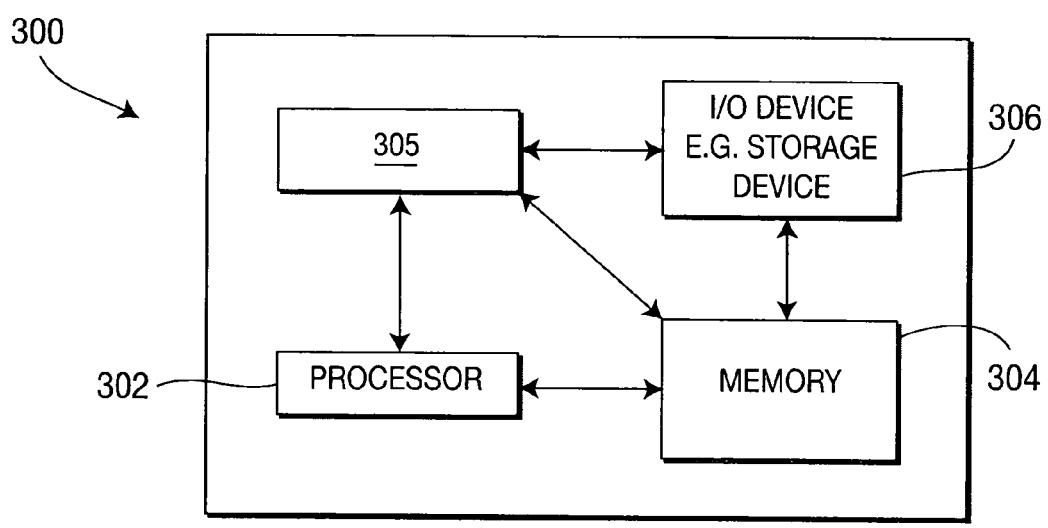
FIG. 3 is a high level block diagram of the A/V synchronization method that is implemented using a general purpose computing device.

FIG. 3 is a high level block diagram of the A/V synchronization method that is implemented using a general purpose computing device 300. In one embodiment, a general purpose computing device 300 comprises a processor 302, a memory 304, an A/V synchronization module 305 and various input/output (I/O) devices 306 such as a display, a keyboard, a mouse, a modem, and the like. In one embodiment, at least one I/O device is a storage device (e.g., a disk drive, an optical disk drive, a floppy disk drive). It should be understood that the A/V synchronization module 305 can be implemented as a physical device or subsystem that is coupled to a processor through a communication channel.

Alternatively, the A/V synchronization module 305 can be represented by one or more software applications (or even a combination of software and hardware, e.g., using Application Specific Integrated Circuits (ASIC)), where the software is loaded from a storage medium (e.g., I/O devices 306) and operated by the processor 302 in the memory 304 of the general purpose computing device 300. Thus, in one embodiment, the A/V synchronization module 305 for synchronizing corresponding audio and video signals of an A/V transmission described herein with reference to the preceding Figures can be stored on a computer readable medium or carrier (e.g., RAM, magnetic or optical drive or diskette, and the like).

Those skilled in the art will appreciate that the methods and apparatuses of the present invention may integrated in A/V systems or devices that process a variety of inputs, such as analog, digital, compressed or encoded representations of video and/or audio signals. Moreover, such capabilities may be integrated in devices that receive digital video and/or digital audio signals, or devices that operate in accordance with observation or indirect monitoring of video signals and/or audio signals or sources of the video signals and/or audio signals (e.g., devices that employ image capturing devices such as cameras, electronic imagers or photocells and audio capturing devices such as microphones, or sound pressure meters). Thus, such devices may function via a wired on unwired connection to the A/V transmission system.

Thus, the present invention represents a significant advancement in the field of audio/visual transmissions (e.g., for digital television broadcasts or the like). The present invention enables efficient measurement and correction of corresponding audio and video signals with minimal modification to the audio and video signals themselves. In particular, embodiments, of the invention modify the audio signal only, leaving the video signal substantially unmodified. Synchronization may therefore be achieved in a manner than is easier and less expensive than existing synchronization applications.

While the foregoing is directed to embodiments of the present invention, other and further embodiments of the invention may be devised without departing from the basic scope thereof, and the scope thereof is determined by the claims that follow.

The invention claimed is:

1. A computer-implemented method for measuring synchronization of an audio/visual transmission originating from an audio/visual transmission system comprising a video signal and a corresponding audio signal, the method being executed by a processor, the method comprising:
   detecting a triggering video event in said video signal;
   detecting a synchronization signal in said audio signal; and
   assessing a synchronization of said video signal and said audio signal in accordance with a time offset between said triggering video event and said synchronization signal, said assessing step further comprising:
      determining an expected time offset representing a period of time expected to elapse between said triggering video event and said synchronization signal;
      determining an actual time offset representing a period of time actually elapsed between said triggering video event and said synchronization signal; and
      calculating a difference between said expected time offset and said actual time offset.

2. The method of claim 1, wherein said synchronization signal is correlated to said triggering video event.

3. The method of claim 1, wherein said video signal and said audio signal are substantially synchronized if said expected time offset and said actual time offset do not differ substantially.

4. The method of claim 1, wherein said video signal and said audio signal are not synchronized if said expected time offset and said actual time offset differ substantially.

5. The method of claim 1, wherein said expected time offset is encoded in said synchronization signal.

6. The method of claim 1, further comprising:
   calculating, in accordance with said time offset, a corrective offset representing a degree to which said audio/visual transmission should be adjusted to achieve synchronization between said video signal and said audio signal.

7. The method of claim 6, further comprising:
   applying said corrective offset to said audio/visual transmission.

8. The method of claim 6, further comprising:
   providing said corrective offset to a correction device capable of applying said corrective offset to said audio/visual transmission.

9. The method of claim 6, wherein said calculating Comprises:
   providing at least two data points, each of said at least two data points representing an actual offset between a triggering video event in said video signal and a corresponding synchronization signal in said audio signal; and
   processing said at least two data points to produce said corrective offset.

10. The method of claim 1, wherein said triggering video event is a predetermined or calculated quality of said video signal that occurs at statistically regular intervals through said video signal.

11. The method of claim 1, wherein said triggering video event is a predetermined or calculated quality of said video signal that is at least one of: irregularly occurring or purposefully inserted at one or more given locations.

12. The method of claim 1, wherein said triggering video event is at least one of: a transition in average brightness of at least a part of said video signal, a transition in color of at least a part of said video signal, a scene change in said video signal, a brightness differential in said video signal, a change in spatial properties of said video signal, a change in temporal properties of said video signal, an appearance of a pattern in said video signal, a disappearance of a pattern in said video signal, a property of an encoded representation of said video signal, a property of a compressed representation of said video signal, one or more images purposefully inserted into said video signal or a combination of events in said video signal.

13. The method of claim 1, wherein said method is applied to an audio/visual system for processing at least one of: multiple audio channels or multiple video channels.

14. The method of claim 13, wherein said multiple audio channels comprise at least one of: multiple channels of stereo audio, multiple channels of surround sound audio or primary and alternate audio.

15. The method of claim 1, wherein said synchronization signal is at least one of: a tone, an audio watermark, a multi-frequency signal, a spread-spectrum signal, a perturbation of a phase of said audio signal, a perturbation of an amplitude of said audio signal, a perturbation of a frequency of said audio signal, a perturbation of one or more characteristics of said audio signal, a modification of an encoded representation of said audio signal, a modification of a compressed representation of said audio signal, a modification of data representing said audio signal, a numeric sequence inserted in said data representing said audio signal, an insertion into auxiliary data carried with said audio signal, a modification of said auxiliary data or a modification of relative audio properties between two or more channels of said audio signal.

16. A computer-readable medium having stored thereon a plurality of instructions, the plurality of instructions including instructions which, when executed by a processor, cause the processor to perform the steps of a method for measuring synchronization of an audio/visual transmission comprising a video signal and a corresponding audio signal, the method comprising:
   detecting a triggering video event in said video signal;
   detecting a synchronization signal in said audio signal; and
   assessing a synchronization of said video signal and said audio signal in accordance with a time offset between said triggering video event and said synchronization signal, said assessing step further comprising:
      determining an expected time offset representing a period of time expected to elapse. between said triggering video event and said synchronization signal;
      determining an actual time offset representing a period of time actually elapsed between said triggering video event and said synchronization signal; and
      calculating a difference between said expected time offset and said actual time offset.

17. Apparatus for measuring synchronization of an audio/visual transmission comprising a video signal and a corresponding audio signal, the apparatus comprising:
   means for detecting a triggering video event in said video signal;
   means for detecting a synchronization signal in said audio signal; and
   means for assessing a synchronization of said video signal and said audio signal in accordance with a time offset between said triggering video event and said synchronization signal, said means for assessing further comprising:
  means for determining an expected time offset representing a period of time expected to elapse between said triggering video event and said synchronization signal;
  means for determining an actual time offset representing a period of time actually elapsed between said triggering video event and said synchronization signal; and
  means for calculating a difference between said expected time offset and said actual time offset.

18. The apparatus of claim 17, wherein input processed by said apparatus comprises at least one of: an analog representation of said video signal, an analog representation of said audio signal, a digital representation of said video signal, a digital representation of said audio signal, a compressed representation of said video signal, an compressed representation of said audio signal, an encoded representation of said video signal or an encoded representation of said audio signal.

19. The apparatus of claim 17, wherein said apparatus is integrated in at least one of: a digital video receiving device or a digital audio receiving device.

20. The apparatus of claim 17, wherein said apparatus operates in accordance with observation of at least one of: said video signal, a source of said video signal, said audio signal or a source of said audio signal.

21. The apparatus of claim 20, wherein said apparatus observes said video signal via at least one visual sensor.

22. The apparatus of claim 21, wherein said at least one visual sensor is at least one of: a camera, an electronic imager or a photocell.

23. The apparatus of claim 20, wherein said apparatus observes said audio signal via at least one audio sensor.

24. The apparatus of claim 23, wherein said at least one audio sensor is at least one of: a microphone or a sound pressure meter.

25. The apparatus of claim 17, further comprising:
  means for correcting said synchronization in accordance with said time offset.

26. The apparatus of claim 25, wherein said means for correcting comprises at least one of: means for adjusting delay of said audio signal, means for adjusting delay of said video signal, means for adjusting time stamps, means for adjusting a position of said audio signal in said transmission, means for adjusting a position of said video signal in said transmission, means for prolonging a display of certain video frames, means for eliminating a display of certain video frames, means for eliminating audio segments, means for shrinking segments or means for extending audio segments.

* * * * *